(12) United States Patent
Leblanc

(10) Patent No.: US 12,156,518 B2
(45) Date of Patent: Dec. 3, 2024

(54) FISHING STORAGE DEVICE

(71) Applicant: WhyTangle LLC, Clifton Park, NY (US)

(72) Inventor: Luc Leblanc, Clifton Park, NY (US)

(73) Assignee: WHYTANGLE LLC, Clifton Park, NY (US)

( * ) Notice: Subject to any disclaimer, the term of this patent is extended or adjusted under 35 U.S.C. 154(b) by 92 days.

(21) Appl. No.: 18/153,123

(22) Filed: Jan. 11, 2023

(65) Prior Publication Data

US 2023/0217910 A1    Jul. 13, 2023

Related U.S. Application Data

(60) Provisional application No. 63/299,012, filed on Jan. 13, 2022.

(51) Int. Cl.
*A01K 87/00* (2006.01)

(52) U.S. Cl.
CPC .......... *A01K 87/005* (2013.01); *A01K 87/009* (2022.02)

(58) Field of Classification Search
CPC ..... A01K 87/005; A01K 87/009; A01K 97/00
See application file for complete search history.

(56) References Cited

U.S. PATENT DOCUMENTS

| | | | | |
|---|---|---|---|---|
| 2,334,646 A | * | 11/1943 | Price | A01K 87/005 43/18.1 R |
| 5,381,619 A | * | 1/1995 | Watkins | A01K 87/005 43/18.1 HR |
| 2002/0023380 A1 | * | 2/2002 | Sunaga | A01K 87/005 43/24 |

OTHER PUBLICATIONS https://www.bdoutdoors.com/forums/threads/great-tip-for-sabaki-storage-for-about-1-50.545701/ (Year: 2014).*

* cited by examiner

*Primary Examiner* — Richard G Davis
(74) *Attorney, Agent, or Firm* — Heslin Rothenberg Farley & Mesiti P.C.; Victor A. Cardona, Esq.

(57) ABSTRACT

A fishing system includes a container having a cavity sized to pass a jig line therethrough and to store the jig line and fasteners for releasably connecting the container to a fishing rod. The fasteners are configured to secure ends of the jig line to an exterior of the container.

17 Claims, 20 Drawing Sheets

FISHING STORAGE DEVICE

CROSS-REFERENCE TO RELATED APPLICATION

This application claims the benefit under 35 U.S.C. § 119(e) of U.S. Provisional Application No. 63/299,012, filed Jan. 13, 2022, the complete disclosure of which is hereby incorporated by reference in its entirety.

TECHNICAL FIELD

This invention relates in general to the field of fishing, particularly to a fishing storage device. More particularly, this invention relates to a fishing system.

BACKGROUND OF THE INVENTION

Often before a fisher attempts to catch large fish, they will first catch smaller fish, called bait fish. To catch these smaller fish, fishers commonly use a jig line which are multiple hook rigs. An example of a jig line may include a fishing line with numerous small, shiny, spaced-apart hooks, said hooks connected by short leader lines, said short leader lines extended outward from a common line. Jig lines are often placed in water to catch bait fish. Such jig lines may be moved up and down so that the hooks attract bait fish to be captured. Bait fish may then be used for catching larger sea creatures, such as dolphin, tuna, marlin, striped bass, etc. Many fishers prefer jig lines to obtain bait fish over other forms of obtaining bait fish, such as net casting or single hook catches.

There are a few problems associated with using jig lines. An example of a problem is that the common line of a jig line can often only be rewound on a pole to which it is connected to a certain point. When that point is met, connected hooks are left free to become tangled amongst other hooks, adjacent gear, articles of clothing, people, and/or animals. Another example of a problem happens when a user stores a jig line. Storage may cause the exposed hooks to roll or otherwise be randomly placed such that the hooks become so entangled that untangling the hooks greatly frustrate the re-use of the jig line.

Time spent untangling hooks for re-use may detract from a fisher's ability to rapidly place a jig line in the water to catch fish in a rapidly moving school, may depreciate fishers' enjoyment of fishing, and may jeopardize the fishers' and others' safety.

Attempts to solve the detangling and storage problem are limited and create other problems as well. As an example, Sabiki rods typically include a hollow fishing rod in single or multiple linear sections onto which a fishing reel is connected. The hollow section stores the jig line when the jig line is not in use. Sabiki rods may be effective at storing and preventing hook entanglement, however, the design can be stiff, bulky, heavy, inconvenient to set-up, can damage fishing lines, and are limited in the size of hooks they can be used with. Moreover, Sabiki rods can be expensive specialized equipment solely dedicated to catching bait fish. This limited use may occupy limited physical space that could be alternatively employed by the fisher, especially where available physical space is limited, for example on a boat or kayak.

Thus, a need exists for a simple to use, compact, multi-purpose, and affordable device for using and safely storing multiple hook rigs for an improved fishing experience.

SUMMARY OF THE INVENTION

The present invention provides, in a first aspect, an attachable fishing device including a container sized to pass a jig line therethrough and to store the jig line. Fasteners attach ends of the jig line to the container and the fasteners can attach the container to a fishing rod.

The present invention provides, in a second aspect, a method for storing a jig line. First, a jig line is received through a container, where the container is sized to be long enough to contain totally or partially all hooks attached to the jig line within the container and the jig line is sized such that extra fishing line extends beyond the length of the container. Second, the free ends of the jig line are attached to both ends of the container through means that can be detached later. In attaching the jig line to both ends of the container, the hooks remain totally or partially within the container.

The present invention provides, in a third aspect, a fishing device that can attach to a fishing rod and contain a jig line within. The fishing device has a container sized to receive a jig line through. When attached to the fishing rod, the end of the container closest to the reel of the fishing rod allows the jig line to connect to the main fishing line attached to the fishing rod. The other end of the container has an opening that allows the jig line to be cast out from the container and reeled back into the container.

BRIEF DESCRIPTION OF THE DRAWINGS

The above and further advantages of the invention may be better understood by referring to the following description, taken in conjunction with the accompanying drawings, in which.

DETAILED DESCRIPTION OF THE INVENTION

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations.

Furthermore, there is no intention to be bound by any expressed or implied theory presented in the preceding technical field, background, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In accordance with the principles of the present invention, systems and methods for using a fishing system are provided.

Figure 1:
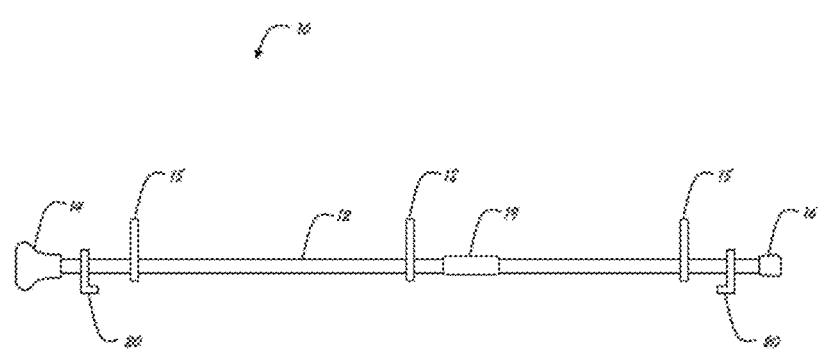
FIG. 1 shows a side view of a container of a fishing system in accordance with the invention.

In an example depicted in FIG. 1, a fishing system 10 (FIG. 2) may include a container 12 to which a flute 14 is connected at one end, and a hollow end cap 16 is connected at the other end of the container. Fasteners 18 may be distributed and connected along the outside of the container 12 at a plurality of positions depending on a length of the fishing system 10 and the length of a fishing rod 40 (illustrated in FIG. 2) to which the fasteners 18 may be connected. Tie points 20 may be connected along an outside of the container 12. At least one of tie points 20 may be connected near the flute 14 at one end of the container 12 while at least another of tie points 20 may be connected near the hollow end cap 16 at the other end of the container 12. Fasteners 18 may be used in conjunction with or instead of tie points. The container 12 may be formed of one section, or multiple sections connected by means of a single connector 19 or multiple connectors 19.

Figure 2:
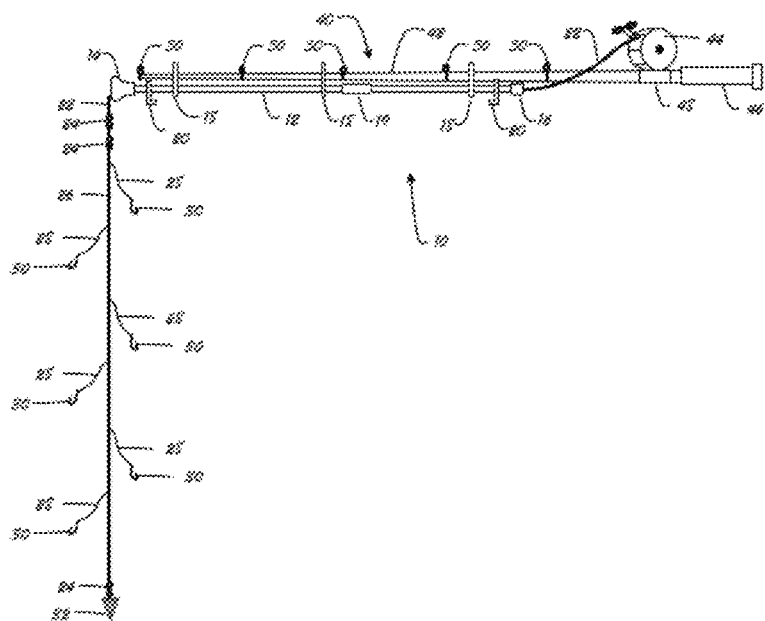
FIG. 2 shows a side view of the fishing system including the container of FIG. 1 and a fishing rod.

In an example depicted in FIG. 2, fishing system 10 may be connected to fishing rod 40 by means of the fasteners 18. The fishing rod 40 may be any conventional fishing rod. The fishing rod 40 may be composed of a tubular rod 42 including a single rod or multiple rod sections. The fishing rod 40 may have a reel seat 48 configured to connect a reel 44 near the rear end of the tubular rod 42. The fishing rod 40 may have a handle 46 connected to the rear end of the tubular rod 42. The fishing rod 40 may have fishing line guides 50 connected to parts of the tubular rod 42 to guide a fishing line 22 if desired. The fishing line 22 may be any conventional fishing line.

Figure 3:
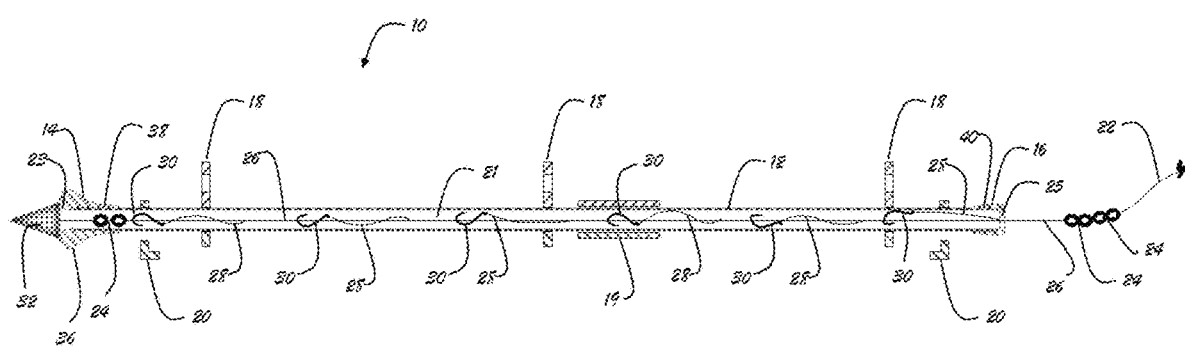
FIG. 3 shows a cross-sectional view of the container of FIG. 1, where the jig line is held inside the container, a weight abuts against a flute, and the jig line is connected to a fishing line.

A reel 44 on which fishing line 22 is stored may be connected to the tubular rod 42 by means of the reel seat 48. The reel 44 may be any conventional reel. In this embodiment, the fishing line 22 may extend through a bore 25 (FIG. 3) of the hollow end cap 16, the container 12, and out through the flute 14 of the fishing system 10 of this invention. A jig line 26 may be connected to a free end of the fishing line 22 by one or multiple swivel connectors 24 or other suitable coupling mechanism. A set of hooks 30 may be connected to the jig line 26 by a set of relatively short leader lines 28. The jig line 26 may be any conventional jig line. A weight 32 may be connected to the end of a free end of the jig line 26 by one or multiple swivel connectors 24 or other suitable coupling mechanism. The weight 32 may be any conventional weight of sufficient size to prevent the weight 32 from entering a bore 23 of the flute 14, as depicted in FIG. 3, for example. In some embodiments, the fishing line 22 may extend through one or multiple fishing line guides (not illustrated) of the fishing rod 40 before extending through the hollow end cap 16.

When use of the fishing system 10 of this invention is desired for catching bait fish, a locking mechanism (not illustrated) on the reel 44 may be released and the fishing line 22, the jig line 26, and the weight 32 may be lowered in water in a normal manner.

When use of the fishing system 10 of this invention is desired for storing the jig line 26 with the hooks 30 and short leader lines 28, while the fishing system 10 is connected to the fishing rod 40 with the fasteners 18, the fishing line 22 may be wound back onto the reel 44. The hooks 30 may slide over the inside surface of the flute body, pass through the bore 23 (FIG. 3) of the flute 14, and into a bore 21 (FIG. 3) of the container 12. The winding of the fishing line 22 onto the reel 44 may be stopped by the action of the weight 32 abutting the open end of the flute 14 (i.e., the weight may be larger than the bore 23 of the flute). Once the fishing line 22 is initially held taut inside the container 12, the locking mechanism (not illustrated) on the reel 44 may prevent the fishing line from unwinding; this maintains the fishing line 22 and the jig line 26 in a taut state inside the container 12. Once the fishing line 22 and the jig line 26 are locked into position, the hooks 30 may be held in place inside the container 12. The container 12 may shield the hooks 30 from the outside environment.

In an example depicted in FIG. 3, a cross-sectional view of the fishing system 10 of this invention shows the container 12, the flute 14, the hollow end cap 16, the fasteners 18, the tie points 20, the connector 19, and the weight 32 of the fishing system 10 of this invention when used for storing the jig line 26 with the hooks 30 and short leader lines 28, while the fishing system 10 is connected to the fishing rod 40 (FIG. 2) with the fasteners 18 and the fishing line 22 and the jig line 26 are in a taut state inside the container 12 by means of the weight 32 abutting the open end of the flute 14, and the locking mechanism on the reel (not illustrated) preventing the fishing line 22 from unwinding, is shown.

As described above, the container 12, the flute 14 and the hollow end cap 16 may include bores 21, 23 and 25, respectively, and each bore may have a diameter at least greater than the width across a hook 30 from the hook's stem to the hook's barb. As depicted, the bore 21 of the container 12 may have a constant profile along its total length, the bore 23 of the flute 14 may have a variable profile along its total length and the bore 25 of the hollow end cap 16 may have a variable profile along its total length. The bore 21 of the container 12 may exhibit surface topography facilitating movement of jig line 26 by reducing contact area for reduced drag friction.

Since the diameter of the bore 21 of the container 12 may not be much greater than the width of the hooks 30, the hooks may be restricted from significant lateral movement relative to a main line of the jig line 26 connecting short leader lines 28 to each other. Such short leader lines 28 may have spacing greater than the overall short leader line 28 length relative to each other. This may prevent one of hooks 30 from catching on the adjacent short leader line 28. This restriction on hooks 30 movement and the relative spacing of the hooks 30 may prevent them from becoming caught on each other or on their own short leader lines 28. Thus, when use of the fishing system 10 is again desired for fishing bait fish, the hooks 30 may be in a ready, untangled state. All that is necessary to release the hooks 30 may be to simply unlock the reel 44 (FIG. 2) so that the fishing line 22 can be unwound.

Figure 4:
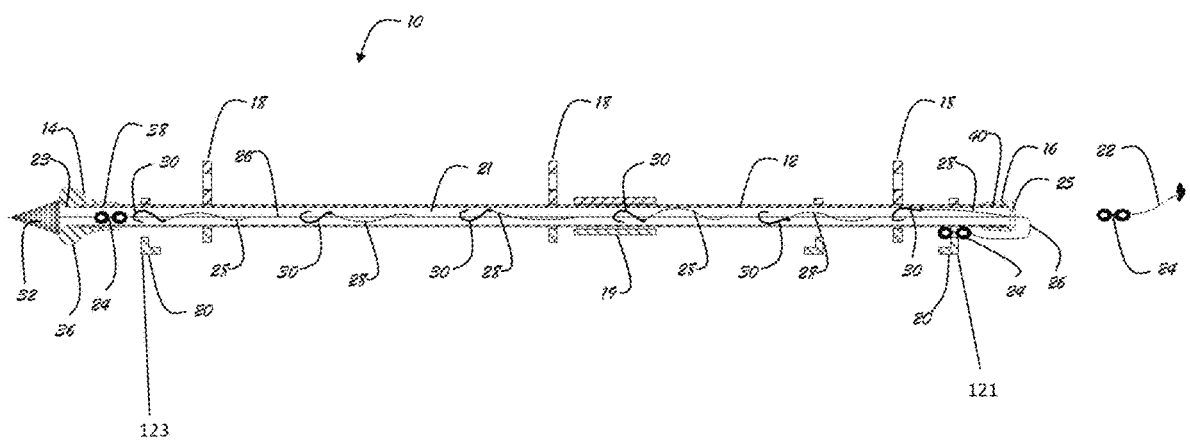
FIG. 4 shows a cross-sectional view of the container of FIG. 1, where the jig line is held inside the container, a weight abuts against a flute, and an end of the jig line is tied to a tie point on an exterior of the container.

In an example depicted in FIG. 4, a cross-sectional view shows the container 12, the flute 14, the hollow end cap 16, the fasteners 18, the tie points 20, the connector 19, and the weight 32 when used for storing the jig line 26 with the hooks 30 and short leader lines 28, when the jig line 26 is not connected to the fishing line 22 and its swivel connector 24. In this embodiment, the swivel connector 24 may be connected at the free end of the jig line 26 that may be tied to a first tie point 121 of tie points 20 located near the hollow end cap 16 at the end of the container 12 at the opposite end from which the flute 14 is connected. Thus, the jig line 26 may be in a taut state inside the container 12 by means of the weight 32 abutting the open end of the flute 14 and the swivel connector 24 connected at the free end of the jig line 26 tied to tie point 121 located near the hollow end cap 16. The free end of the jig line 26 may be tied to tie point 121 using the swivel connector 24, or any part of the free end of the jig line 26 itself.

As described above, the container 12, the flute 14 and the hollow end cap 16 may have bores (e.g., bores 21, 23 and 25) with diameters at least greater than the width across one or more of hooks 30 from its stem to its barb. The bore 21 of the container 12 may have a constant profile along its total length, the bore 23 of the flute 14 may have a variable profile along its total length and the bore 25 of the hollow end cap 16 may have a variable profile along its total length. The bore 21 of the container 12 may exhibit surface topography facilitating movement of jig line 26 by reducing contact area for reduced drag friction.

Since the diameter of the bore 21 of the container 12 may not be much greater than the width of the hooks 30, the hooks may be restricted from significant lateral movement relative to the main line of the jig line 26 as described above. The short leader line 28 spacing may be greater than the overall short leader line 28 length. This may prevent one of hooks 30 from catching on the adjacent short leader line 28. This restriction on hook (e.g., hooks 30) movement and the relative spacing of the hooks may prevent them from becoming caught on each other or on their own short leader lines 28. Thus, when use of the fishing system 10 is again desired for fishing fish baits, the hooks 30 may be in a ready, untangled state.

In this embodiment, container 12 may be connected with the fasteners 18 to a fishing rod 40 (FIG. 2) or any other suitable assembly (not illustrated) or can be used as a stand-alone storage device. Little additional care may need to be taken in stowing the detachable storing device (i.e., container 12) whether or not it is connected to a fishing rod or any other suitable assembly since the hooks 30 may be fully contained in the detachable storing device.

Figure 5:
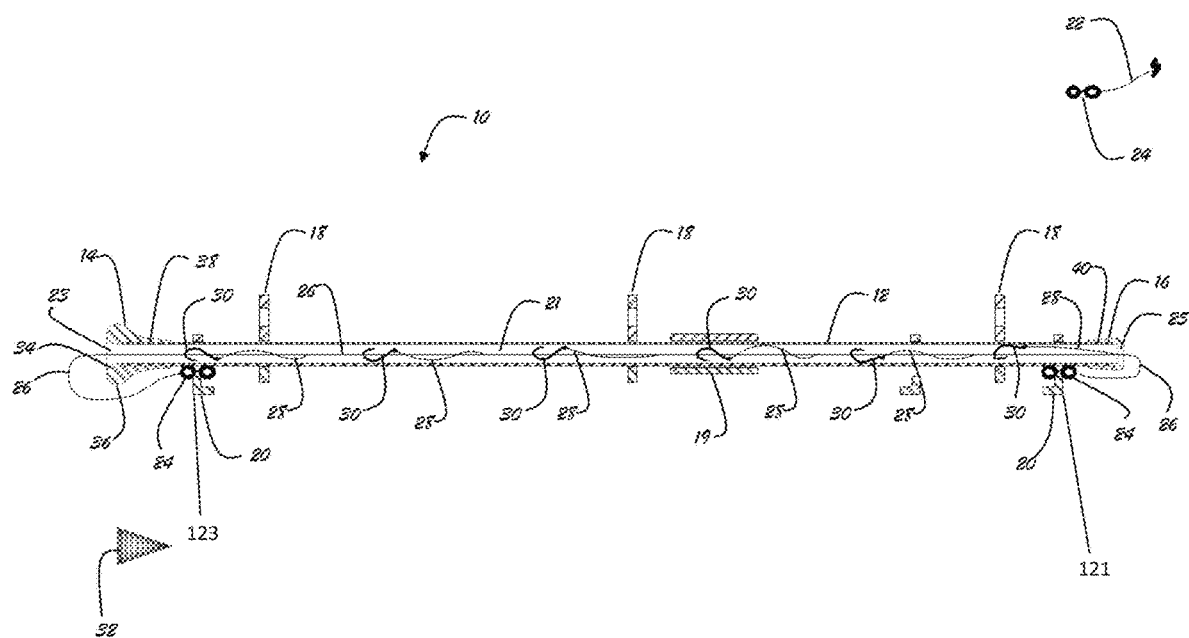
FIG. 5 shows a cross-sectional view of the container of FIG. 1, where a jig line is held taut inside of a container by fastening both ends of the jig line to tie points connected to the container's exterior.

In an example depicted in FIG. 5, a cross-sectional view shows container 12, the flute 14, the hollow end cap 16, the fasteners 18, the connector 19, and the tie points 20 when it is used for storing the jig line 26 with the hooks 30 and short leader lines 28, when the jig line 26 is not connected to the fishing line 22 and its swivel connector 24, and when the weight 32 is not connected to the jig line 26 and its swivel connector 24. In this embodiment, the swivel connectors 24 may be connected to both free ends of the jig line 26 at tie points 20 located near the hollow end cap 16 at one end of the container 12 and the flute 14 at the other end of the container 12. Thus, the jig line 26 may be in a taut state inside the container 12 by means of the swivel connector 24 connected at one of the free ends of the jig line 26 that may be tied to a tie point (e.g., tie point 121) located near the hollow end cap 16 and by means of the swivel connector 24 connected at the other free end of the jig line 26 tied to a tie point 123 of tie points 20 located near the flute 14. The free ends of the jig line 26 may be tied to tie point 123 using the swivel connector 24, or any part of the free ends of the jig line 26 itself.

As indicated above, the container 12, the flute 14 and the hollow end cap 16 may have bores (e.g., bores 21, 23 and 25) with a diameter at least greater than the width across a hook 30 from its stem to its barb. The bore 21 of the container 12 may have a constant profile along its total length, the bore 23 of the flute 14 may have a variable profile along its total length and the bore 25 of the hollow end cap 16 may have a variable profile along its total length. The bore 21 of the container 12 may exhibit surface topography facilitating movement of jig line 26 by reducing contact area for reduced drag friction.

As indicated above, since the diameter of the bore 21 of the container 12 may not be much greater than the width of the hooks 30, the hooks may be restricted from significant lateral movement relative to the main line of the jig line 26. The short leader line 28 spacing may be greater than the overall short leader line 28 length. This may prevent a hook 30 from catching on the adjacent short leader line 28. This restriction on hook 30 movement and the relative spacing of the hooks 30 may prevent them from becoming caught on each other or on their own short leader lines 28. Thus, when use of the fishing system 10 is again desired for fishing fish baits, the hooks 30 may be in a ready, untangled state.

In this embodiment, container 12 may be connected with the fasteners 18 to a fishing rod 40 (FIG. 2) or any other suitable assembly (not illustrated) or can be used as a stand-alone storage device. Little additional care may need to be taken in stowing the detachable storing device (i.e., container 12) whether or not it is connected to a fishing rod or any other suitable assembly since the hooks 30 may be fully contained in the detachable storing device.

Figure 6:
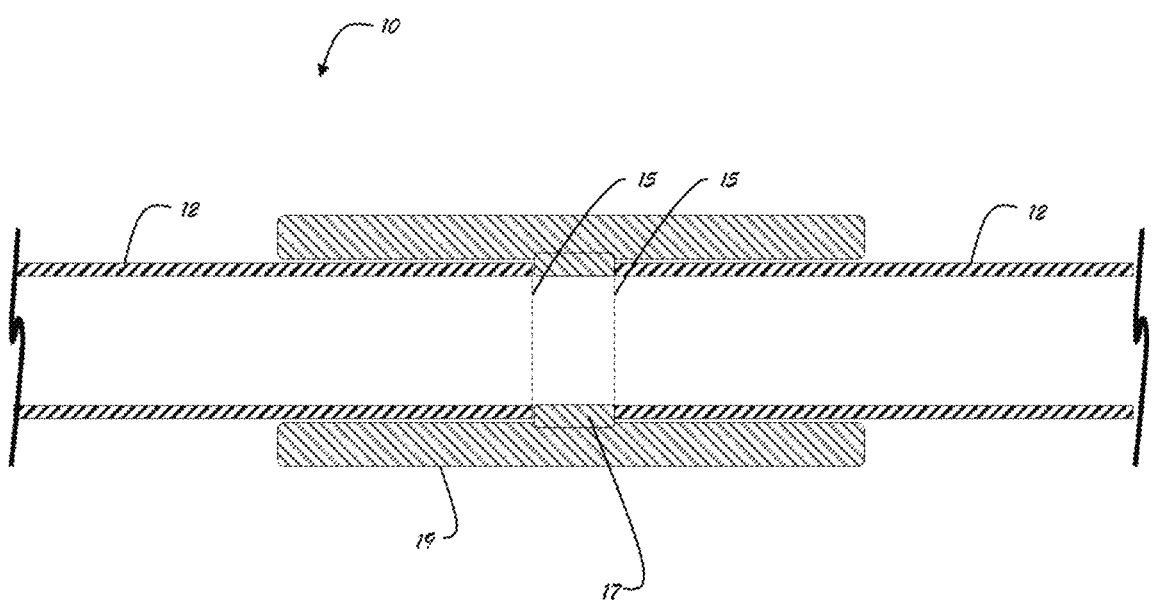
FIG. 6 shows a partial cross-sectional view of portions of containers made out of multiple bodies, with two bodies attached through a connector.

In an example depicted in FIG. 6, a cross-sectional view shows a portion of the container 12 and the connector 19 of the fishing system 10 of this invention. The connector 19 may comprise an internal profile element 17 where the free ends of bodies abut to form an internal passage of substantially the same continuous profile between the bodies and connector 19. In this example, container 12 may be formed in two pieces connected to each other in contrast to the single piece formation depicted above.

Figure 7:
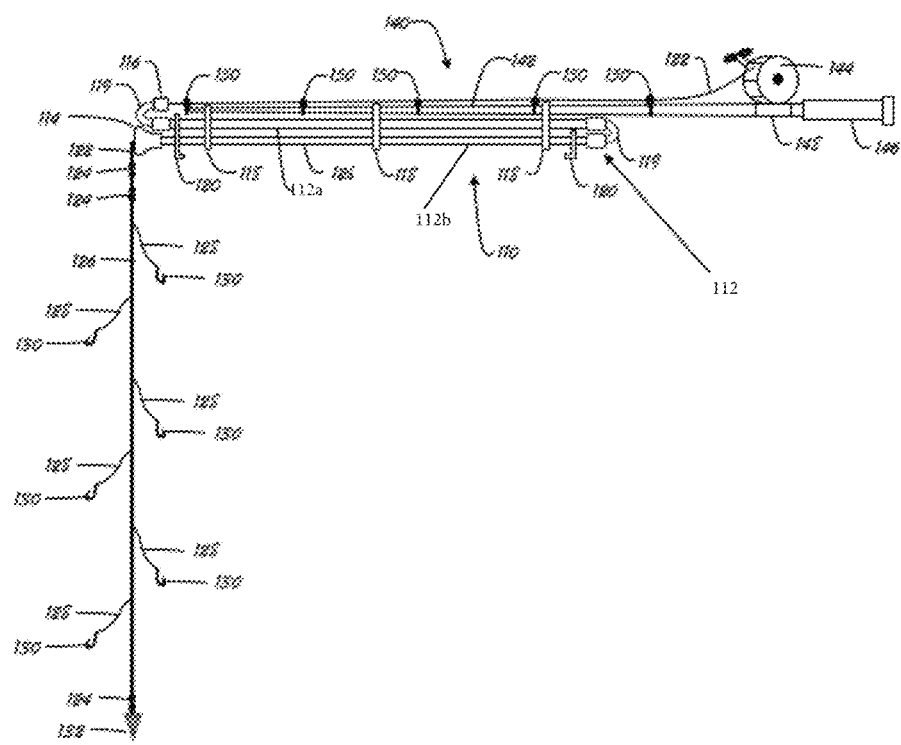
FIG. 7 shows a side view of a fishing system in accordance with this invention where multiple bodies are connected in parallel through connectors.

In an example depicted in FIG. 7, a fishing system 110 includes multiple bodies or container portions connected in parallel as shown. Identical reference numbers are used for identical items to system 10 while similar numbers (e.g., 12 and 112, 14 and 114) are used for similar parts. A container 112 having parallel container portions 112a, 112b may be connected to fishing rod 140 by means of fasteners 118 as described above relative to container 12 and fishing rod 40. Further, container 112 may be used as described above relative to container 12 except for the different alignment of the parallel bodies (i.e., container sections or portions 112a, 112b) making up container 112 as depicted and described. A flute 114 may be identical to flute 14 described above. A hollow end cap 116 may be identical to hollow end cap 16. A fishing line 122 may be identical to fishing line 22. Hooks 130 may be identical to hooks 30. A weight 132 may be identical to weight 32. A jig line 126 may be identical to jig line 26. Fishing rod 140 may be identical to fishing rod 40.

As described above relative to system 10 including container 12, when use of the fishing system 110 of this invention is desired for storing the jig line 26 with the hooks 30 and short leader lines 28, while the fishing system 10 is connected to the fishing rod 40 with the fasteners 18, the fishing line 22 is wound back onto the reel 44. The hooks 30 may slide over the inside surface of the flute body, pass through the bore of the flute, and into the bore of the container 12. The winding of the fishing line 22 onto the reel 44 may be stopped by the action of the weight 32 abutting the open end of the flute 14. Once the fishing line 22 may be initially held taut inside the container 12, the locking mechanism (not illustrated) on the reel 44 may prevent the fishing line from unwinding; this may maintain the fishing line 22 and the jig line 26 in a taut state inside the container sections 112a and 112b. Once the fishing line 22 and the jig line 26 are locked into position, the hooks 30 may be held in place inside the container 12. The container 112 may shield the hooks 30 from the outside environment.

The container 112 may be formed of composite material, thermoplastic, thermoset plastic, wood, metal, rubber, or any other material or combination of materials capable of withstanding the loads to which the storage device is exposed to. In preferred embodiments, the container 112 may be formed of materials that are substantially resistant to atmospheric conditions and water and is resistant to wear against the fishing line 22. In a preferred embodiment, the container 112 may be formed of fiberglass material or of carbon fiber composite material.

The shape of the container sections 112a, 112b may be tubular with any inside or outside profile, such as square, rectangular, triangular, cylindrical or any other profile large enough to contain the hooks 30. The outside profile and inside profile of the container may not be necessarily the same profile. The container inside and outside profiles may be variable along the length of the container. In a preferred embodiment, the container 112a, 112b may include parallel cylindrical tubes (i.e., container sections 112a, 112b) as depicted with constant inside diameter and outside diameter along its length.

The inside profile of the container sections 112a, 112b may be large enough to contain the hooks 30. The hooks 30 may be of any size. In some preferred embodiments, the inside diameter of the cylindrical tube may be less than 50 mm. In some further preferred embodiments, the inside diameter of the cylindrical tube may be less than 25 mm. In some further preferred embodiments, the inside diameter of the cylindrical tube may be less than 20 mm. In some further preferred embodiments, the inside diameter of the cylindrical tube may be less than 15 mm. In some further preferred embodiments, the inside diameter of the cylindrical tube may be less than 10 mm. In some further preferred embodiments, the inside diameter of the cylindrical tube may be less than 5 mm.

Figure 8:
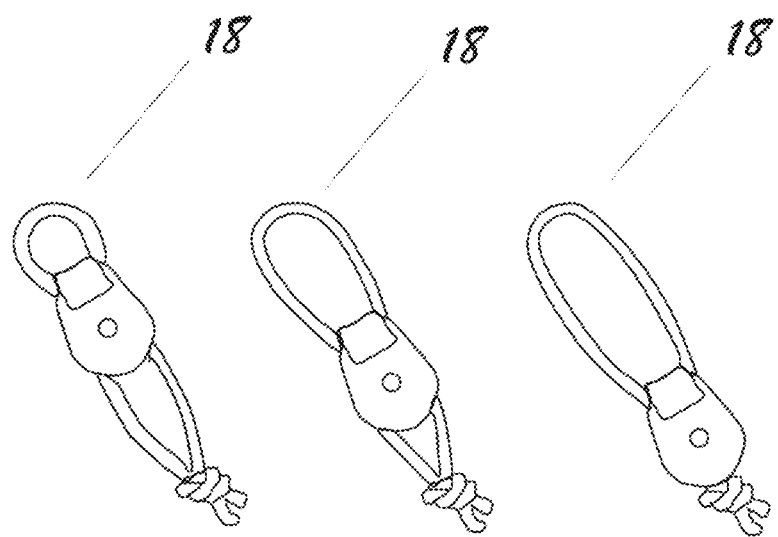
FIG. 8 shows an example of a fastener in three stages: when the fastener is in a secured state, when the fastener is in between a secured state and a loose state, and when the fastener is in a loose state.
Figure 20:
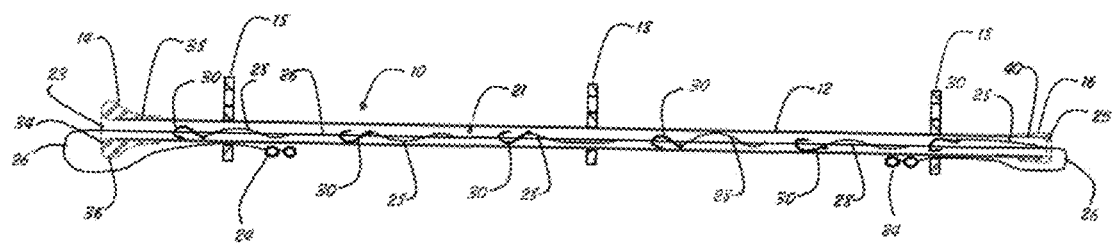
FIG. 20 is shows a cross-sectional view of the container of FIG. 1, where the jig line is held inside the container, and ends of the jig line are connected to an exterior of the container

In an example depicted in FIG. 8, an embodiment of the fasteners 18 is shown. The fasteners 18 may be used to connect the fishing system 10/110 to the fishing rod 40/140 by tightening the fasteners 18 as shown in the left iteration of the fastener as depicted in FIG. 8, and as depicted in FIG. 20. The fasteners 18 may be used to disconnect the fishing system 10/110 from the fishing rod 40/140 by loosening the fastener as shown in the right iteration of the fastener 18 as depicted in FIG. 8. Further, the fasteners 18 may be used to connect opposite free ends of the jig line 26/126 to a container (e.g., container 12, container 112) by fastening the free ends to surfaces (e.g., exterior surface) of such a container via a friction fit as depicted in FIG. 20. In another example, each of such free ends may be attached to a weight, leader, swivel connector, float, bobber or any other object that may facilitate an attachment of the free ends to such a surface by such a fastener (e.g., via a friction fit). For example, one or more of the free ends having an object attached thereto may be secured to a surface of a container by being secured at a location away from an open end of the container while an opposite portion of the jig line 26 may extend toward the bore 21 of the container similar to that depicted in FIG. 5 where the free ends are attached to the tie points. The example depicted in FIG. 8 should not be construed as limiting, as any device that could connect the fishing system to the fishing rod can be used as a fastener, through means such as fastening, tying, taping, attaching, gluing, screwing, etc.

Figure 9:
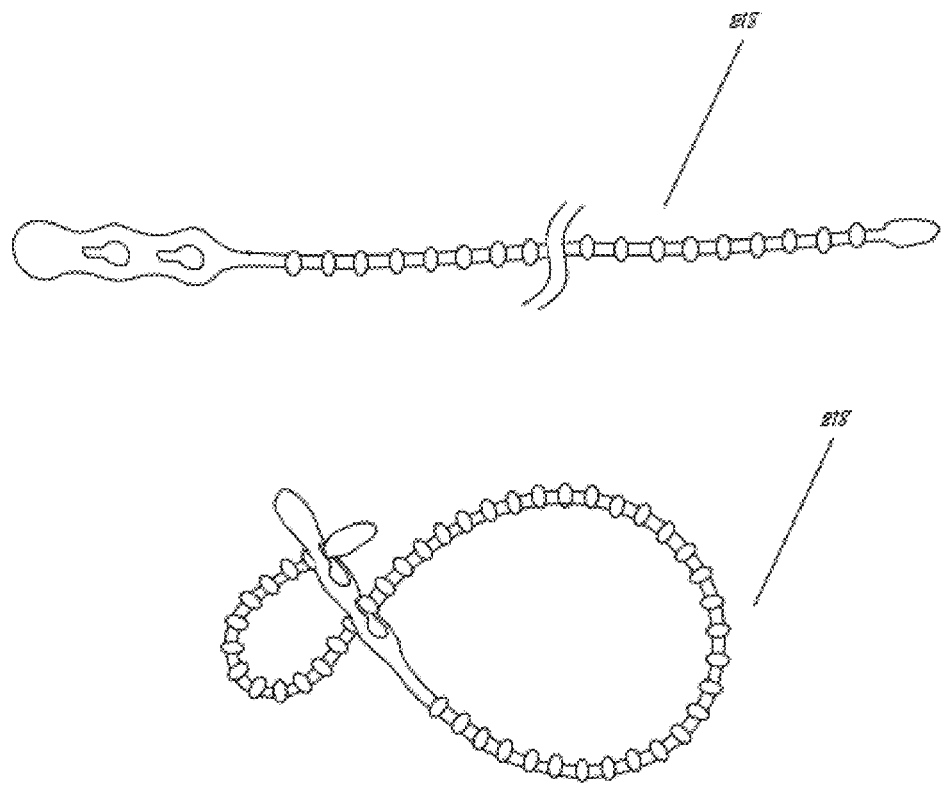
FIG. 9 shows an example of a fastener in two stages: when the fastener is in a loose state and when the fastener is in a secured state.

In an example depicted in FIG. 9, another example of fasteners 218 used for a same purpose as fasteners 18 is shown. The fasteners 218 may be used to connect to a container (e.g., container 12, container 112) the fishing rod 40/140 by tightening the fasteners 218 as shown in the bottom iteration of the fastener 218 as depicted in FIG. 9. The fasteners 218 may be used to disconnect a container (e.g., container 12) from the fishing rod 40 by loosening the fastener 218 as shown in the top iteration of the fastener 18 as depicted in FIG. 9. Such fastener may also be used to connect free ends of a jig line to a container (e.g., container 12) as described above. The examples depicted in FIGS. 8-9 should not be construed as limiting, as any device that could connect the fishing system to the fishing rod can be used as a fastener, through means such as fastening, tying, taping, attaching, gluing, screwing, etc.

Figure 10:
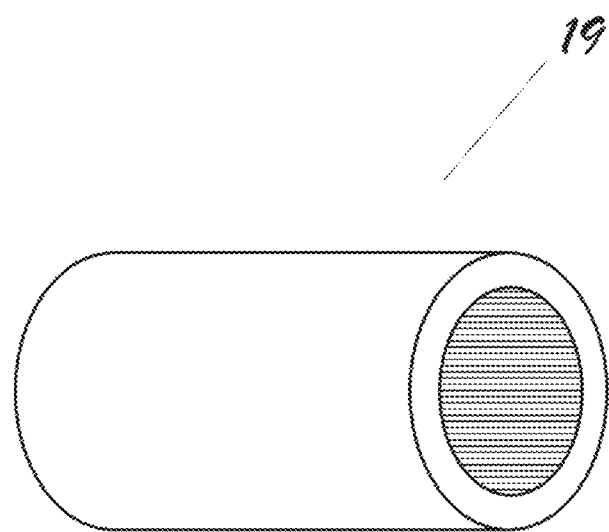
FIG. 10 shows a perspective view of a connector that can be used to attach multiple containers bodies for receiving jig lines colinearly.
Figure 11:
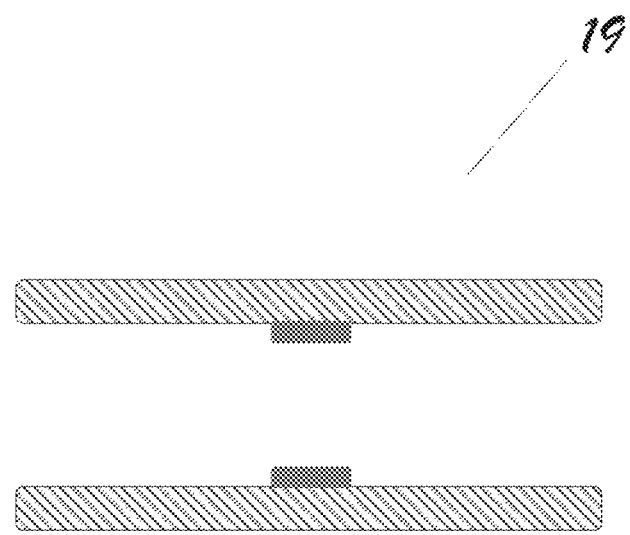
FIG. 11 shows a cross-sectional view of the connector of FIG. 10.

In an example depicted in FIG. 10, a perspective view of a connector 19 is shown. The connector 19 may be used to create a container made out of multiple bodies as described above relative to FIG. 6. Each body (e.g., portions of a container) may be inserted into an end of the connector 19, which may fit through any means appropriate, such as adhesive means, a clearance fit, etc. In an example depicted in FIG. 11, a cross-sectional view of connector 19 is shown. The internal diameter of the connector 19 may have substantially the same internal diameter as the container's 12 innermost diameter (i.e., at an abutment point of container portions inserted therein), so as to prevent any hooks 30 from catching onto or getting stuck inside the container 12.

The connector 19 may be formed of composite material, thermoplastic, thermoset plastic, wood, metal, rubber, or any other material or combination of materials capable of withstanding the loads to which the storage device is exposed to. In preferred embodiments, the connector 19 may be formed of materials that are substantially resistant to atmospheric conditions and water and is resistant to wear against the fishing line 22. In a preferred embodiment, the connector 19 may be formed of plastic or metal material.

Figure 12:
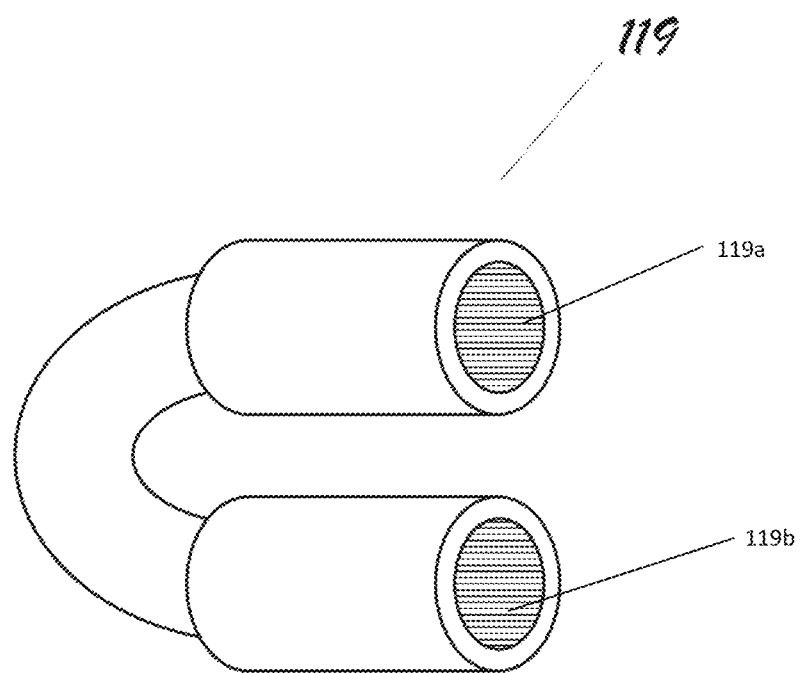
FIG. 12 shows a perspective view of a connector that can be used to attach multiple container bodies for receiving jig lines in parallel.

In an example depicted in FIG. 12, a perspective view of a connector 119 is shown. The connector 119 may be used to create a container 112 made out of multiple parallel bodies, such as container 112a, 112b described above. Each container portion may be inserted into an end 119a or 119b of the connector 119, which may fit through any means appropriate, such as adhesive means, a clearance fit, etc.

Figure 13:
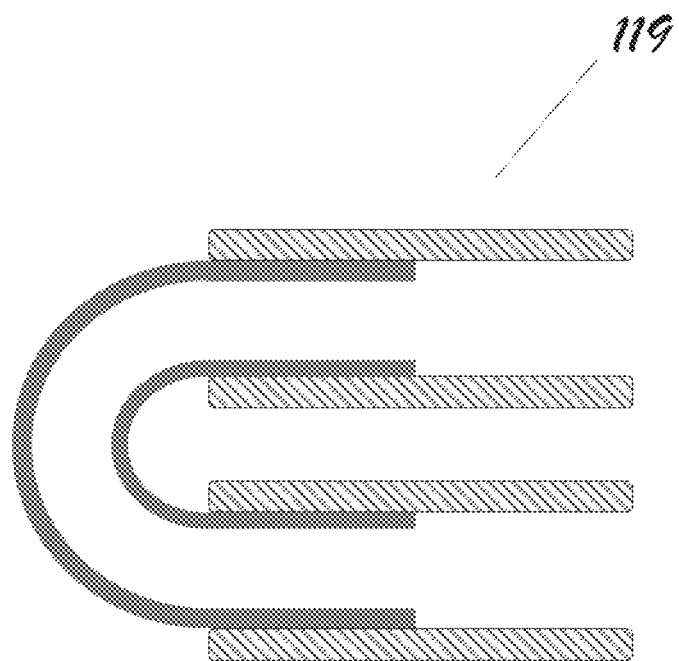
FIG. 13 shows a cross-sectional view of the connector of FIG. 12.

The connector 119 may be formed of composite material, thermoplastic, thermoset plastic, wood, metal, rubber, or any other material or combination of materials capable of withstanding the loads to which the storage device is exposed to. In preferred embodiments, the connector 119 may be formed of materials that are substantially resistant to atmospheric conditions and water and is resistant to wear against the fishing line 22. In a preferred embodiment, the connector 119 may be formed of plastic or metal material. In an example depicted in FIG. 13, a cross-sectional view of connector 119 is shown.

Figure 14:
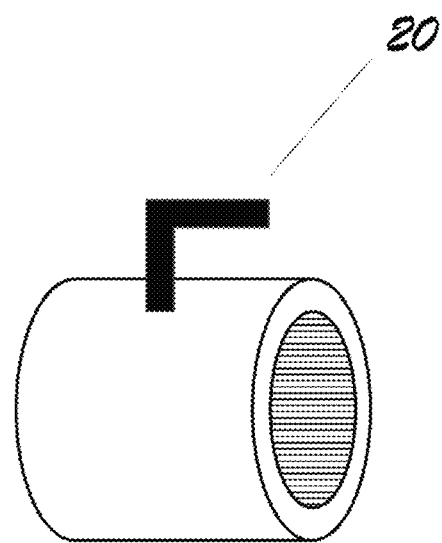
FIG. 14 shows a perspective view of a tie point extending from an exterior of a portion of a container for receiving jig lines.

In an example depicted in FIG. 14, a perspective view of a tie point (e.g., tie point 121, tie point 123) of tie points 20 is shown. Such a tie point may extend from the exterior of the container 12 and may be connected to the container 12 through any means necessary, such as adhesive means, a clearance fit, monolithic formation relative to, etc. For example, as described above, one of free ends of jig line 26 may be connected to (e.g., tied to) one of tie points 20 when the jig line 26 is no longer being used for fishing.

The tie points 20 may be formed of composite material, thermoplastic, thermoset plastic, wood, metal, rubber, or any other material or combination of materials capable of withstanding the loads to which the storage device is exposed to. In preferred embodiments, the tie points 20 may be formed of materials that are substantially resistant to atmospheric conditions and water and is resistant to wear against the fishing line 22. In a preferred embodiment, the tie points 20 may be formed of plastic or metal material. A fishing system, such as fishing system 10 described above) may include one or more such tie points, as described above.

Figure 15:
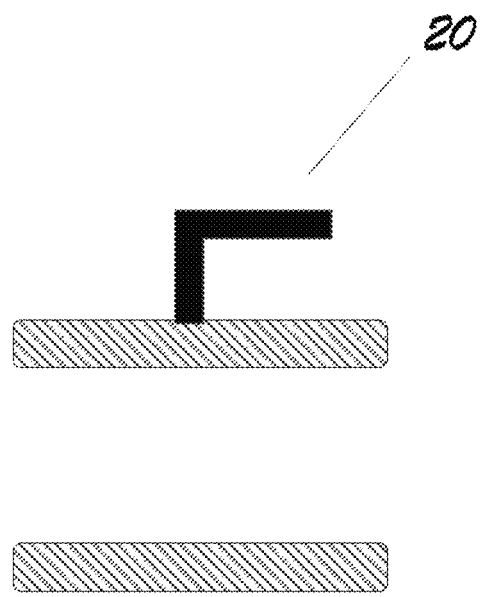
FIG. 15 shows a cross-sectional view of the tie point on the container of FIG. 14.

FIG. 15 is a side cross section of a tie point (e.g., tie point 121, tie point 123) and a portion of a container (e.g., the container 12) described above relative to FIG. 14.

Figure 16:
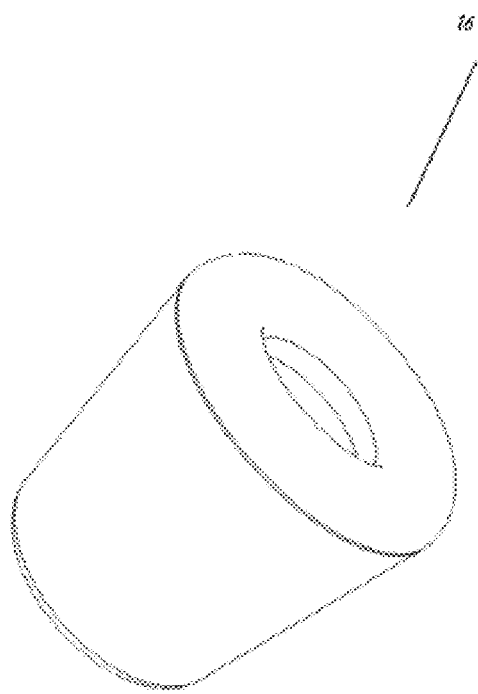
FIG. 16 shows a perspective view of a hollow end cap that can be fitted to an end of a container.

In an example depicted in FIG. 16, a perspective view of a hollow end cap 16 is shown. The hollow end cap 16 may be inserted onto an end of the container 12 and may be connected to the container 12 through any means necessary, such as adhesive means, a clearance fit, etc.

The hollow end cap 16 may be formed of composite material, thermoplastic, thermoset plastic, wood, metal, rubber, or any other material or combination of materials capable of withstanding the loads to which the storage device is exposed to. In preferred embodiments, the hollow end cap 16 may be formed of materials that are substantially resistant to atmospheric conditions and water and is resistant to wear against the fishing line 22. In a preferred embodiment, the hollow end cap 16 may be formed of plastic material.

Figure 17:
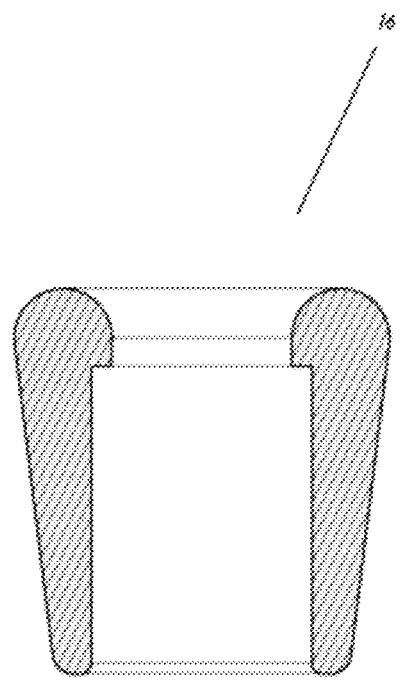
FIG. 17 shows a cross-sectional view of the hollow end cap of FIG. 16.

In an example depicted in FIG. 17, a cross-sectional view of hollow end cap 16 is shown.

Figure 18:
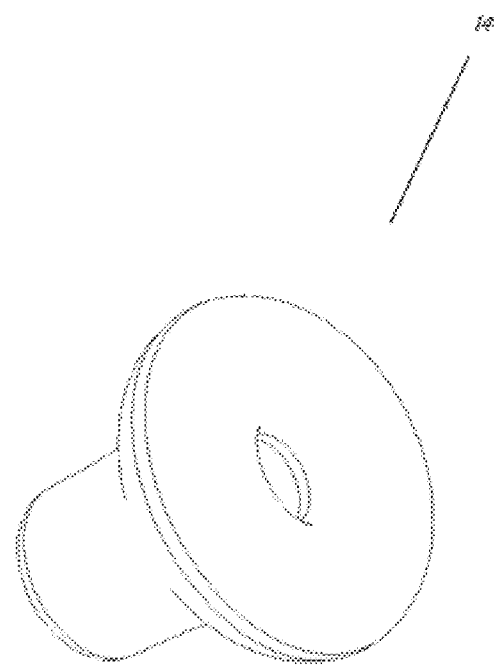
FIG. 18 shows a perspective view of a flute that can be fitted to an end of a container and configured to allow a jig line to be extended therethrough when fishing.

In an example depicted in FIG. 18, a perspective view of flute 14 is shown. The flute 14 may be inserted onto an end of the container 12 and may be connected to the container 12 through any means necessary, such as adhesive means, a clearance fit, etc.

The flute 14 may be formed of composite material, thermoplastic, thermoset plastic, wood, metal, rubber, or any other material or combination of materials capable of withstanding the loads to which the storage device is exposed to. In preferred embodiments, the flute 14 may be formed of materials that are substantially resistant to atmospheric conditions and water and is resistant to wear against the fishing line 22. In a preferred embodiment, the flute 14 may be formed of plastic.

Figure 19:
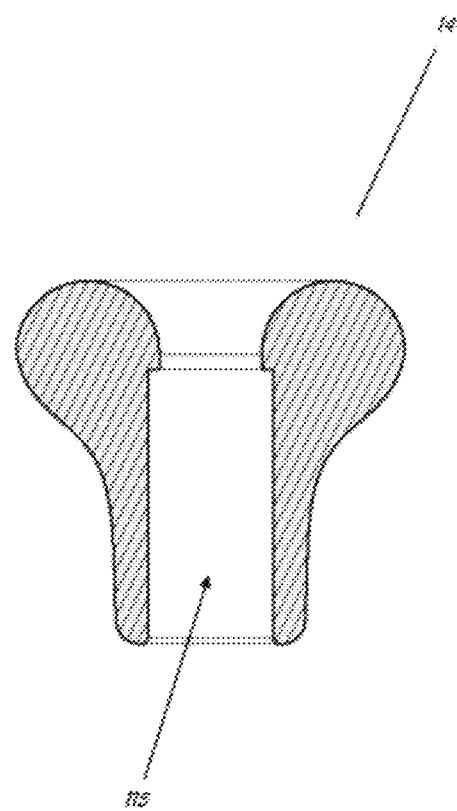
FIG. 19 shows a cross-sectional view of the flute of FIG. 18.

In an example depicted in FIG. 19, a cross-sectional view of flute 14 is shown.

In a preferred embodiment, the inside diameter of the cylindrical tube may be close to 10.6 mm and the outside diameter of the cylindrical tube may be close to 12.8 mm. In some further preferred embodiments, the inside diameter of the cylindrical tube may be close to 8.6 mm and the outside diameter of the cylindrical tube may be close to 10.5 mm. In some further preferred embodiments, the inside diameter of the cylindrical tube may be close to 17.0 mm and the outside diameter of the cylindrical tube may be close to 18.9 mm. In some further preferred embodiments, the inside diameter of the cylindrical tube may be close to 12.7 mm and the outside diameter of the cylindrical tube may be close to 15.3 mm.

The length of the container 12 may be any length at least sufficient to contain the hooks 30 of the jig line 26 fully or partially. The container 12 may or may not form a straight length. In some embodiments, the length of the container 12 may be at least 3000 mm. In some further preferred embodiments, the length of the container 12 may be at least 2500 mm. In some further preferred embodiments, the length of the container 12 may be at least 2000 mm. In some further preferred embodiments, the length of the container 12 may be at least 1500 mm. In some further preferred embodiments, the length of the container 12 may be at least 1000 mm. In some further preferred embodiments, the length of the container 12 may be at least 500 mm. In some further preferred embodiments, the length of the container 12 may be at least 250 mm. In some further preferred embodiments, the length of the container 12 may be at least 200 mm. In some further preferred embodiments, the length of the container 12 may be at least 150 mm. In some further preferred embodiments, the length of the container 12 may be at least 100 mm. In some further preferred embodiments, the length of the container 12 may be at least 50 mm. In some further preferred embodiments, the length of the container 12 may be at least 25 mm.

The container 12 may or may not have features along its length, such as holes, opening, protrusion or any other suitable features. For example, the container 12 may comprise features formed integrally that acts as fasteners 18, tie points 20, or connectors 19.

The container 12 may be formed of one or multiple sections connected temporarily or permanently together by any means suitable to perform the operation, such as adhesive, welding, mechanical attachment, or any other means capable of accomplishing the required task. In some preferred embodiments, the container 12 may be formed by a single body. In some further preferred embodiments, the container 12 may be formed by multiple bodies connected by a single or multiple connectors 19. In some preferred embodiments, the container 12 may form a straight length. In some further preferred embodiments, the container 12 may not form a straight length.

The flute 14 may be a separate part of the fishing system 10 of this invention or may be formed integrally (i.e., monolithically) with the container 12. When the flute 14 is a separate part, it may be temporarily or permanently connected to the container 12 by any means suitable to perform the operation, such as adhesive, welding, mechanical attachment, or any other means capable of accomplishing the required task. In a preferred embodiment of the invention, the flute 14 may be connected to the container 12 by use of a bonding agent.

The flute 14 may be formed of composite material, thermoplastic, thermoset plastic, wood, metal, rubber, or any other material or combination of materials capable of withstanding the loads to which the storage device is exposed to. In preferred embodiments, the flute 14 may be formed of materials that are substantially resistant to atmospheric conditions and water and is resistant to wear against the fishing line 22. In a preferred embodiment, the flute 14 may be formed of thermoplastic.

In some embodiments, the flute 14 may have a body that defines an outwardly tapered bore that is of narrow profile adjacent where the flute is coupled with the container 12 and widest at the open end of the flute 14. The flute internal profile where it abuts with the container 12 may be of similar profile and size to that of the internal profile of the container 12. This facilitates the movement of the hooks 30 into the container 12. The flute internal profile 38 where it surrounds container 12 may be of similar profile and size to that of the external profile of the container 12. The entire bore along the long axis of the flute can be straight, or any other acceptable shape or profile to allow the hooks to pass through.

The portion of the flute body defining the open end of the flute 14 is further formed to have an outwardly curved profile 34; this facilitates the movement of the hooks 30 into the container 12. The flute 14 also may have an outwardly curved lip 36 that extends outward from the open end of the flute 14. The lip 36 may have a curved profile with a radius of curvature large enough to prevent the hooks 30 from catching onto the flute 14. This profile minimizes the possibility that the hooks 30 will become caught on the flute 14 as they are reeled into the container 12.

In a preferred embodiment, bore 23 along the long axis of the flute 14 may be straight and a profile of the bore may be circular. In a preferred embodiment, both the flute internal profile where it abuts with the container 12 and the internal profile of the container 12 may be circular with internal diameter close to 10.6 mm, and the flute internal profile 38 where it surrounds container 12 may be of similar profile and with and internal diameter close to 12.8 mm, similar to the outside diameter of the container 12. The transition in diameter between the flute 14 and the container 12 may be relatively small and the path between the flute 14 and the container 12 may have a relatively continuous internal profile so that any hooks 30 can travel through the container 12 without getting caught or stuck. In some further preferred embodiments, both the flute internal profile where it abuts with the container 12 and the internal profile of the container 12 may be circular with internal diameter close to 8.6 mm, and the flute internal profile 38 where it surrounds container 12 is of similar profile and with and internal diameter close to 10.5 mm, similar to the outside diameter of the container 12. The transition in diameter between the flute 14 and the container 12 may be relatively small and the path between the flute 14 and the container 12 may have a relatively continuous internal profile so that any hooks 30 can travel through the container 12 without getting caught or stuck. In some further preferred embodiments, both the flute internal profile where it abuts with the container 12 and the internal profile of the container 12 may be circular with internal diameter close to 17.0 mm, and the flute internal profile 38 where it surrounds container 12 is of similar profile and with and internal diameter close to 18.9 mm, similar to the outside diameter of the container 12. The transition in diameter between the flute 14 and the container 12 may be relatively small and the path between the flute 14 and the container 12 may have a relatively continuous internal profile so that any hooks 30 can travel through the container 12 without getting caught or stuck. In some further preferred embodiments, both the flute internal profile where it abuts with the container 12 and the internal profile of the container 12 may be circular with internal diameter close to 12.7 mm, and the flute internal profile 38 where it surrounds container 12 is of similar profile and with and internal diameter close to 15.3 mm, similar to the outside diameter of the container 12. The transition in diameter between the flute 14 and the container 12 may be relatively small and the path between the flute 14 and the container 12 may have a relatively continuous internal profile so that any hooks 30 can travel through the container 12 without getting caught or stuck.

The flute 14 may or may not have features along its length, such as holes, opening, protrusion, tie points or any other suitable features. For example, the flute 14 may comprise features formed integrally that acts as fasteners 18, tie points 20, or connectors 19.

The hollow end cap 16 may be a separate part of the fishing system 10 of this invention or it may be formed integrally (i.e., monolithically) with the container 12. When the hollow end cap 16 is a separate part, it can be temporarily or permanently connected to the container 12 by any means suitable to perform the operation, such as adhesive, welding, mechanical attachment, or any other means capable of accomplishing the required task. In a preferred embodiment of the invention, the hollow end cap 16 is connected to the container 12 by use of a bonding agent. In some other embodiments, the hollow end cap 16 may not exist.

The hollow end cap 16 may be formed of composite material, thermoplastic, thermoset plastic, wood, metal, rubber, or any other material or combination of materials capable of withstanding the loads to which the storage device is exposed to. In preferred embodiments, the hollow end cap 16 may be formed of materials that are substantially resistant to atmospheric conditions and water and is resistant to wear against the fishing line 22. In a preferred embodiment, the hollow end cap 16 may be formed of thermoplastic.

The hollow end cap 16 may have a body that defines an outwardly tapered bore that is of narrow profile adjacent where the hollow end cap may be coupled with the container 12 and widest at the open end of the hollow end cap 16. The hollow end cap internal profile where it abuts with the container 12 may be of similar profile and size to that of the internal profile of the container 12. This facilitates the movement of the main line 22 and jig line 26 into the container 12 and also reduces the chance that any hooks 30 will get caught or stuck inside container 12 while moving through the container 12. The hollow end cap internal profile where it surrounds container 12 may be of similar profile and size to that of the external profile of the container 12. The entire bore along the long axis of the hollow end cap may be straight, or any other acceptable shape.

In a preferred embodiment, the bore along the long axis of the hollow end cap may be straight and the profile of the bore is circular. In a preferred embodiment, both the hollow end cap internal profile where it abuts with the container 12 and the internal profile of the container 12 may be circular with internal diameter close to 10.6 mm, and the hollow end cap internal profile where it surrounds container 12 is of similar profile and with and internal diameter close to 12.8 mm, similar to the outside diameter of the container 12. The transition in diameter between the hollow end cap 16 and the container 12 may be relatively small and the path between the hollow end cap 16 and the container 12 may have a relatively continuous internal profile so that any hooks 30 can travel through the container 12 without getting caught or stuck. In some further preferred embodiments, both the hollow end cap internal profile where it abuts with the container 12 and the internal profile of the container 12 may be circular with internal diameter close to 8.6 mm, and the hollow end cap internal profile where it surrounds container 12 may be of similar profile and with and internal diameter close to 10.5 mm, similar to the outside diameter of the container 12. The transition in diameter between the hollow end cap 16 and the container 12 may be relatively small and the path between the hollow end cap 16 and the container 12 may have a relatively continuous internal profile so that any hooks 30 can travel through the container 12 without getting caught or stuck. In some further preferred embodiments, both the hollow end cap internal profile where it abuts with the container 12 and the internal profile of the container 12 may be circular with internal diameter close to 17.0 mm, and the hollow end cap internal profile where it surrounds container 12 may be of similar profile and with and internal diameter close to 18.9 mm, similar to the outside diameter of the container 12. The transition in diameter between the hollow end cap 16 and the container 12 may be relatively small and the path between the hollow end cap 16 and the container 12 may have a relatively continuous internal profile so that any hooks 30 can travel through the container 12 without getting caught or stuck. In some further preferred embodiments, both the hollow end cap internal profile where it abuts with the container 12 and the internal profile of the container 12 may be circular with internal diameter close to 12.7 mm, and the hollow end cap internal profile where it surrounds container 12 is of similar profile and with and internal diameter close to 15.3 mm, similar to the outside diameter of the container 12. The transition in diameter between the hollow end cap 16 and the container 12 may be relatively small and the path between the hollow end cap 16 and the container 12 may have a relatively continuous internal profile so that any hooks 30 can travel through the container 12 without getting caught or stuck.

The hollow end cap 16 may or may not have features along its length, such as holes, opening, protrusion, tie points or any other suitable features. For example, the hollow end cap 16 may comprise features formed integrally (i.e., monolithically) that acts as fasteners 18, tie points 20, or connectors 19.

The connector 19 may be a separate part of the fishing system 10 of this invention or it may be formed integrally (i.e., monolithically) with one or more parts of the container 12. Multiple connectors 19 may be used to connect multiple sections of the container 12. When the connector 19 is a separate part, it may be temporarily or permanently connected to the container 12 by any means suitable to perform the operation, such as adhesive, welding, mechanical attachment, or any other means capable of accomplishing the required task. In a preferred embodiment of the invention, the connector 19 may be connected to the container 12 by use of an adhesive. In some other embodiments, the connector 19 may not exist.

The connector 19 may be formed of composite material, thermoplastic, thermoset plastic, wood, metal, rubber, or any other material or combination of materials capable of withstanding the loads to which the storage device is exposed to. In preferred embodiments, the connector 19 may be formed of materials that are substantially resistant to atmospheric conditions and water and is resistant to wear against the fishing line 22. In a preferred embodiment, the connector 19 may be formed of thermoplastic.

The connector 19 internal profile where it surrounds container 12 may be substantially of similar profile and size to that of the external profile of the container 12. The connector 19 may comprise an internal profile element 17 where the free ends of bodies 15 abut to form an internal passage of substantially the same continuous profile between the bodies and connector 19, which reduces the chance that any hooks 30 will get caught or stuck inside container 12 while moving through the container 12.

In a preferred embodiment, the bore along the long axis of the connector 19 may be straight and the profile of the bore may be circular. In a preferred embodiment, both the connector internal profile element 17 where it abuts with the container 12 and the internal profile of the container 12 may be circular with internal diameter close to 10.6 mm, and the connector internal profile where it surrounds container 12 may be of similar profile and with and internal diameter close to 12.8 mm, similar to the outside diameter of the container 12. The transition in diameter between the connector 19 and the container 12 may be relatively small and the path between the connector 19 and the container 12 may have a relatively continuous internal profile so that any hooks 30 can travel through the container 12 without getting caught or stuck. In some further preferred embodiments, both the connector internal profile element 17 where it abuts with the container 12 and the internal profile of the container 12 may be circular with internal diameter close to 8.6 mm, and the connector internal profile where it surrounds container 12 is of similar profile and with and internal diameter close to 10.5 mm, similar to the outside diameter of the container 12. The transition in diameter between the connector 19 and the container 12 may be relatively small and the path between the connector 19 and the container 12 may have a relatively continuous internal profile so that any hooks 30 can travel through the container 12 without getting caught or stuck. In some further preferred embodiments, both the connector internal profile element 17 where it abuts with the container 12 and the internal profile of the container 12 may be circular with internal diameter close to 17.0 mm, and the connector internal profile where it surrounds container 12 is of similar profile and with and internal diameter close to 18.9 mm, similar to the outside diameter of the container 12. The transition in diameter between the connector 19 and the container 12 may be relatively small and the path between the connector 19 and the container 12 may have a relatively continuous internal profile so that any hooks 30 can travel through the container 12 without getting caught or stuck. In some further preferred embodiments, both the connector internal profile element 17 where it abuts with the container 12 and the internal profile of the container 12 may be circular with internal diameter close to 12.7 mm, and the connector internal profile where it surrounds container 12 is of similar profile and with and internal diameter close to 15.3 mm, similar to the outside diameter of the container 12. The transition in diameter between the connector 19 and the container 12 may be relatively small and the path between the connector 19 and the container 12 may have a relatively continuous internal profile so that any hooks 30 can travel through the container 12 without getting caught or stuck.

The connector 19 may or may not have features along its length, such as holes, opening, protrusion, tie points or any other suitable features. For example, the connector 19 may comprise features formed integrally that acts as fasteners 18 or tie points 20 or hollow end cap 16.

The connector 19 may or may not be straight. For example, the connector 19 may be curved. In a preferred embodiment, the connector 19 forms a 180° angle to connect two sections of the container 12 that are located parallel to each other, as illustrated in FIG. 7.

The fasteners 18 may be any connector for connecting (e.g., releasably or fixedly) the storage device 10 and the fishing rod 40 to each other. In a preferred embodiment of the invention, the fasteners 18 may not be permanently connected to the container 12 and may be positioned and secured anywhere along the length of the container 12 or the fishing rod 40. In an example, so-called "zip-ties" or "cable ties" may be used as fasteners 18, with the so-called "zip-ties" or "cable ties" preferably having a non-slip surface surrounding either or both the container 12 and the fishing rod 40 to provide solid connection.

The fasteners 18 may be formed of composite material, thermoplastic, thermoset plastic, wood, metal, rubber, fabric, or any other material or combination of materials capable of withstanding the loads to which the storage device is exposed to. In preferred embodiments, the fasteners 18 may be formed of materials that are substantially resistant to atmospheric conditions and water. In a preferred embodiment, the fasteners 18 may be formed of thermoplastic and rubber materials.

The tie points 20 may be separate parts of the fishing system 10 of this invention or may be formed integrally (i.e., monolithically) with the container 12. When the tie points 20 are separate parts of the container 12, they may be temporarily or permanently connected to the container 12 by any means suitable to perform the operation, such as adhesive, welding, mechanical attachment, or any other means capable of accomplishing the required task. The tie points 20 may be used to tie one or two of the free ends of the jig line 26 to maintain the jig line inside the container 12 (e.g., in a taut or loose state) when the storage device 10 may be used to store the jig line 26.

The tie points 20 may be formed of composite material, thermoplastic, thermoset plastic, wood, metal, rubber, or any other material or combination of materials capable of withstanding the loads to which the storage device is exposed to. In preferred embodiments, the tie points may be formed of materials that are substantially resistant to atmospheric conditions and water. In a preferred embodiment, the tie points 20 may be formed of thermoplastic and rubber materials.

This invention relates to a fishing system (e.g., fishing hook storage device or system 10/fishing hook storage device or system 110) that may prevent the entanglement of hooks (e.g., hooks 30, hooks 130) used to catch fish with a single or a plurality of hooks (e.g., hooks 30, hooks 130). As described, such a fishing system (e.g., system 10, system 110) may include a fishing rod (e.g., fishing rod 40, fishing rod 140), a container (e.g., container 12, container 112), a flute (e.g., flute 14, flute 114) located on one end of the container (e.g., container 12, container 112) and a hollow end cap (e.g., hollow end cap 16, hollow end cap 116) located at the other end of the container (e.g., container 12, container 112). Fasteners (e.g., fastener 18/fastener 118, fastener 218) and/or tie points (e.g., tie point 20/tie point 120) may be located along an outside of the container (e.g., container 12, container 112). The container (e.g., container 12, container 112) may be formed of one or multiple sections connected by means of connectors (e.g., connector 119) and may connect to a fishing rod (e.g., fishing rod 42/fishing rod 142) or, alternatively, may be used as a stand-alone storage device when not connected to the fishing rod (e.g., fishing rod 42/fishing rod 142).

When the fishing system (e.g., system 10/system 110) may be connected to a fishing rod (e.g., fishing rod 42/fishing rod 142) by means of fasteners (e.g., fasteners 18, fasteners 118, fastener 218) and used for fishing, a main fishing line (e.g., fishing line 22, fishing line 122) extends from a fishing reel (e.g., fishing reel 44, fishing reel 144) through a hollow end cap (e.g., hollow end cap 16, hollow end cap 116), a container (e.g., container 12, container 112), and a flute (e.g., flute 14, flute 114). A jig line (e.g., jig line 22, jig line 122) to which one or a number of spaced-apart hooks (e.g., hooks 30, hooks 130) are connected may be connected to a free end of the main line (e.g., fishing line 22, fishing line 122). A weight (e.g., weight 32, weight 132) having a selected diameter bigger than an opening or an internal diameter of the flute (e.g., flute 14, flute 114) may be connected to the free end of the jig line (e.g., jig line 22, jig line 122). The open end of the flute (e.g., flute 14, flute 114), the hollow end cap (e.g., hollow end cap 16, hollow end cap 116) and the bore defined by the container (e.g., container 12, container 112) may have internal diameters that are larger than the width of the hooks (e.g., hooks 30, hooks 130).

Once a fisher has finished fishing with the assembly of this invention, the fishing line (e.g., fishing line 22, fishing line 122) and fishing rig (e.g., jig line 26, jig line 126) may be reeled into the container (e.g., container 12, container 112). The hooks (e.g., hooks 30, hooks 130) move with the fishing line (e.g., fishing line 22, fishing line 122) through the open end of the flute (e.g., flute 14, flute 114) into the bore of the container (e.g., container 12, container 112). The further reeling in of the fishing line (e.g., fishing line 22, fishing line 122) forces the weight (e.g., weight 32, weight 132) against the open end of the flute (e.g., flute 14, flute 114). A lock mechanism integral with the reel (e.g., reel 44, reel 144) may then prevent the fishing line (e.g., fishing line 22, fishing line 122) from unwinding and keeps the fishing line (e.g., fishing line 22, fishing line 122) taut inside the container (e.g., container 12, container 112). Once the hooks (e.g., hooks 30, hooks 130) of the jig line (e.g., jig line 26, jig line 126) are reeled into the container (e.g., container 12, container 112) of this invention, they may be shielded from the outside environment. This prevents the hooks (e.g., hooks 30, hooks 130) from becoming caught on any object adjacent the rod such as other gear, the fisher's clothing or a living being. Since the line to which the hooks (e.g., hooks 30, hooks 130) are connected becomes taut when it is reeled into the container (e.g., container 12, container 112), the hooks (e.g., hooks 30, hooks 130) may stay spaced apart from each other and may not tangle. Consequently, once the jig line (e.g., jig line 26, jig line 126) is reeled into the container (e.g., container 12, container 112), little additional care needs to be taken in stowing the fishing hook storage device (e.g., fishing hook storage device 10, fishing hook storage device 110) and fishing rod (e.g., fishing rod 40, fishing rod 140). The hooks (e.g., hooks 30, hooks 130) may be readily placed in the water again by simply unlatching the reel (e.g., reel 44, reel 144) to unreel the fishing line (e.g., fishing line 22, fishing line 122). This ability to rapidly get the hooks (e.g., hooks 30, hooks 130) into the water may increase the fisher's ability to catch bait fish.

The fishing systems (e.g., fishing hook storage device 10, fishing hook storage device 110) described above may be compact, light, easy to set-up, may accommodate large fishing hooks and may be more affordable compared to the so-called sabiki rods. Moreover, when the fishing systems (e.g., fishing hook storage device 10, fishing hook storage device 110) are connected to a fishing rod (e.g., fishing rod 40, fishing rod 140) by means of the fasteners (e.g., fastener 18, fastener 218, fastener 118) and used for catching bait fish, the sensitivity of the fishing rod (e.g., fishing rod 40, fishing rod 140) is minimally or not affected by the connection of a container (e.g., container 12, container 112) to a fishing rod (e.g., fishing rod 40, fishing rod 140) so the fisher can benefit from the inherent sensitivity of the rod (e.g., fishing rod 40, fishing rod 140) to sense when bait fish are touching the hooks (e.g., hooks 30, hooks 130) or the jig line (e.g., jig line 26, jig line 126).

The storage device or container (e.g., container 12, container 112) may be detachable from the fishing rod (e.g., fishing rod 40, fishing rod 140) by releasing the fasteners (e.g., fasteners 18, fasteners 118, fasteners, 218) located along the outside of the container (e.g., container 12, container 112) to become a stand-alone storage device for the jig line (e.g., jig line 26, jig line 126). The hooks (e.g., hooks 30, hooks 130) of the jig line (e.g., jig line 26, jig line 126) are first reeled into the container (e.g., container 12, container 112). The jig line (e.g., jig line 26, jig line 126) is then disconnected from the main fishing line (e.g., main fishing line 22, main fishing line 122). The free end of the jig line (e.g., jig line 26, jig line 126) may be tied to a tie point (e.g., tie point 20, tie point 120) located onto the outside of the container (e.g., container 12, container 112) or otherwise secured to the container such that the jig line remains therein. The line (e.g., lead line 26, lead line 126) to which the hooks (e.g., hooks 30, hooks 130) are connected may become taut when the free end of the jig line (e.g., jig line 26, jig line 126) is tied to a tie point (e.g., tie point 20, tie point 120) and a weight (e.g., weight 32, weight 132) is against the open end of the flute (e.g., flute 14, flute 114) at the other end of the container, the hooks (e.g., hooks 30, hooks 130) may stay spaced apart from each other and do not tangle. This may prevent the hooks (e.g., hooks 30, hooks 130) from becoming caught on any object adjacent the rod (e.g., fishing rod 40, fishing rod 140) such as other gear, the fisher's clothing or a living being.

Since the jig line (e.g., jig line 26, jig line 126) may not be connected to the main line (e.g., fishing line 22, fishing line 122), the storage device or container (e.g., container 12, container 112) where the fishing hooks (e.g., hooks 30, hooks 130) are stowed may be disconnected from the rod (e.g., fishing rod 40, fishing rod 140) by releasing the fasteners (e.g., fasteners 18, fasteners 118, fasteners 218) along the outside of the container (e.g., container 12, container 112) to become a stand-alone fishing hook storage device (e.g., container 12, container 112) for the jig line (e.g., jig line 26, jig line 126).

Consequently, little additional care needs to be taken in stowing the fishing system (e.g., fishing system 10, fishing system 110) of this invention when the container (e.g., container 12, container 112) holding the jig line (e.g., jig line 26, jig line 126) is released from the fishing rod (e.g., fishing rod 40, fishing rod 140). In addition, the ability to detach the fishing system (e.g., fishing system 10, fishing system 110) from the rod (e.g., fishing rod 40, fishing rod 140) frees the fishing rod (e.g., fishing rod 40, fishing rod 140) to be used for other purposes (e.g., fishing using a standard fishing line using the bait caught using the jig line) by the fisher. The container (e.g., container 12, container 112) may be re-connected to the fishing rod (e.g., fishing rod 40, fishing rod 140) if the fisher desires to again catch bait fish, using the jig line, for example, or for the purpose of stowing the container (e.g., container 12, container 112) and rod (e.g., fishing rod 40, fishing rod 140) together.

While several aspects of the present invention have been described and depicted herein, alternative aspects may be affected by those skilled in the art to accomplish the same objectives. Accordingly, it is intended to cover all such alternative aspects as fall within the true spirit and scope of the invention.

The invention claimed is:
1. A fishing system, comprising:
a container having a cavity sized to pass a jig line therethrough and to store the jig line;
a plurality of fasteners for releasably connecting the container to a fishing rod, and a fastener of said plurality of fasteners configured to secure an end of the jig line to an exterior of the container;
a flute attached to an end of the container and having a smooth and continuous internal surface, the flute configured to promote free motion of the jig line and inhibit hooks attached to the jig line from catching on an internal surface of the container via the smooth and continuous internal surface; and
the flute having a first internal surface bounding the cavity and the container having a second internal surface bounding the cavity, said first surface and said second surface projecting inwardly at said interface point such that said first surface and said second surface form a smooth and continuous internal surface at said interface point.

2. The system of claim 1, wherein the plurality of fasteners is configured to secure ends of the jig line to the exterior of the container after the container and the fishing rod are disconnected.

3. The system of claim 1, wherein the container further comprises tie points extending out from the exterior of the container and located adjacent opposite ends of the container, the plurality of fasteners configured to secure ends of the jig line to said tie points to maintain the jig line in the cavity.

4. The system of claim 1, wherein the container has a body bounding the cavity and further comprising a plurality of bodies having a plurality of cavities in communication with the cavity, the plurality of cavities configured to store the jig line.

5. The system of claim 1, wherein the container has a body bounding the cavity and further comprising a plurality of colinear bodies having a plurality of colinear cavities in communication with the container, the plurality of colinear cavities configured to store the jig line.

6. The system of claim 1, wherein the cavity is cylindrical and an inside diameter of the cavity is less than 50 mm, less than 25 mm, less than 20 mm, less than 15 mm, less than 10 mm, or less than 5 mm.

7. The system of claim 1, further comprising:
a hollow end cap attached to an end of the container and having a smooth and continuous internal surface, the hollow end cap configured to promote free motion of the jig line and inhibit hooks attached to the jig line from catching on an internal surface of the container via the smooth and continuous internal surface; and
the hollow end cap having a first internal surface bounding the cavity and the container having a second internal surface bounding the cavity, the first surface and the second surface abutting each other at an interface point, said first surface and said second surface projecting inwardly at said interface point such that said first surface and said second surface form a smooth and continuous internal surface at said interface point.

8. The system of claim 1, further comprising:
the container having a body bounding the cavity and further comprising a plurality of bodies having a plurality of additional cavities in communication with the cavity, the plurality of additional cavities configured to store the jig line;
the plurality of additional bodies attached to each other with one or more connectors; the plurality of bodies configured to inhibit hooks attached to the jig line from catching on an internal surface of the plurality of bodies, through the plurality of bodies having smooth and continuous body internal surfaces;
the one or more connectors configured to inhibit the hooks from catching on an internal surface of the one or more connectors, through the one or more connectors having smooth and continuous connector internal surfaces; and
the body internal surfaces and the connector internal surfaces meeting at interface points and having same internal heights to inhibit the hooks from catching on the interface points.

9. The system of claim 1, further comprising a weight connected to a second end of the jig line, the weight being larger than an opening bounded by the internal surface of the flute such that the weight is inhibited from entering the container.

10. A method for use in fishing comprising:
receiving a jig line in a cavity of a storage body;
releasably securing each end of the jig line to opposite ends of the storage body to hold hooks attached to the jig line in the cavity;
releasing a first end of the jig line from a first end of the ends of the storage body: attaching the first end of the jig line to a fishing line attached to a fishing rod, attaching a flute to a second end of the ends of the storage body, and attaching a weight a maximum cross-sectional area larger than an opening of the flute to a second end of the jug line such that the weight avoids entering the container.

11. The method of claim 10, wherein the releasably securing each end of the jig line to opposite ends of the storage body comprises releasably securing each end to a tie point attached to the storage body.

12. The method of claim 10, wherein the releasably securing each end of the jig line to opposite ends of the storage body comprises releasably securing each end of the jig line to the storage body via fasteners placed around the ends of the jig line and the body such that the hooks attached to the jig line stay within the storage body.

13. The method of claim 10, further comprising releasably connecting the body to a fishing rod.

14. A fishing system, comprising:
a container having a cavity receiving a jig line therein;
the container releasably connected to a fishing rod having a reel;
a first end of the container connected to a first end of the fishing rod and a first end of the jig line extending from the first end of the container to connect to a fishing line connected to the reel of the fishing rod;
a second end of the container connected to a second end of the fishing rod and having a second opening to allow a second end of the jig line to be cast from the second end of the container by a user and to allow the jig line to be reeled in by the user into the cavity.

15. The fishing system of claim 14 wherein the second end of the contain comprises a flute having a curved surface shaped to promote free motion of the jig line and inhibit hooks attached to the jig line from catching on the container.

16. The fishing system of claim 14 wherein the first end of the jig line is connected to the container after being disconnected from the fishing line and the second end of the jig line is connected to the container to hold the jig line in the container.

17. The fishing system of claim 14 further comprising a weight connected to the second end of the jig line, the weight larger than an opening of the second end of the container such that the weight is inhibited from entering the container.

* * * * *